United States Patent [19]

Faulkner

[11] Patent Number: 5,121,389
[45] Date of Patent: Jun. 9, 1992

[54] REGENERATIVE NODE FOR A COMMUNICATIONS NETWORK

[75] Inventor: David W. Faulkner, Ipswich, England

[73] Assignee: British Telecommunications public limited company, Great Britain

[21] Appl. No.: 571,589

[22] PCT Filed: Apr. 6, 1989

[86] PCT No.: PCT/GB89/00356

§ 371 Date: Aug. 29, 1990

§ 102(e) Date: Aug. 29, 1990

[87] PCT Pub. No.: WO89/10033

PCT Pub. Date: Oct. 19, 1989

[30] Foreign Application Priority Data

Apr. 8, 1988 [GB] United Kingdom ............... 8808301

[51] Int. Cl.⁵ .......................... H04J 3/00; H04B 3/36
[52] U.S. Cl. ........................................... 370/97
[58] Field of Search ................. 370/97, 107, 105.3

[56] References Cited

U.S. PATENT DOCUMENTS

| | | | |
|---|---|---|---|
| 3,852,534 | 12/1974 | Tilk | 370/107 |
| 3,962,635 | 6/1976 | Roza | 370/97 |
| 4,791,653 | 12/1988 | McFarland et al. | 370/107 |
| 4,876,683 | 10/1989 | Suzuki | 370/97 |

*Primary Examiner*—Douglas W. Olms
*Assistant Examiner*—Dang Ton
*Attorney, Agent, or Firm*—Nixon & Vanderhye

[57] ABSTRACT

A regenerative node for use with scrambled, time domain multiplexed (TDM) data channels has a delay-lock receiver for locking onto a channel scrambled by its associated scramble sequence or a common scramble sequence; a transmitter slaved to the receiver for providing data to be transmitted by the node which has been scrambled by the another node's scramble sequence or any empty channel signal scrambled by the common scramble sequence in phase synchronism with the TDM channel to which the receiver is locked; and a regenerator for regenerating the received TDM channels or the TDM channels with the transmitted data overwriting the delay-locked channel. A node wishing to set up a call searches and delay-locks to a channel having a channel empty sequence scrambled by the common sequence and once delay-locked to it transmits a signal scrambled by the destination nodes sequence. The other node will subsequently delay-lock to this channel and transmit to the first node in the same TDM channel using the scramble sequence of the first node. The invention finds particular application in ring networks for 2-way video communications.

5 Claims, 3 Drawing Sheets

REGENERATIVE NODE FOR A COMMUNICATIONS NETWORK

BACKGROUND OF THE INVENTION

1. Field of the Invention

This invention relates to a regenerative node for a communications network and particularly, but not exclusively, to ring networks for two way video signal communication between pairs of nodes.

2. Related Prior Art

A number of local area network (LAN) topologies and access protocols have been proposed or developed which meet the requirements for data or voice transmission. Optical fibres have been recognised as a means of providing very wide bandwidths for LANs with prospects of interactive video services. One of the problems with existing LAN designs is that they do not lend themselves to easy upgrading either from data to telephony or from telephony to video transmission. For the full bandwidth potential of optical fibres to be exploited, consideration of the limitations of the network topologies and access protocols is required at the outset and, if possible, an evolutionary programme defined so that installations can be upgraded without loss of service to initial users. A further factor which must be considered is the initial cost of provision of the network. It is unrealistic to add a surcharge for future services to a network which initially has only a rudimentary function.

One of the first LAN structures to emerge was Ethernet. This has a bus topology and transmits data packets via a contention access protocol. Optical fibre derivatives of this system have been proposed based upon a star topology. Ethernet is, however, unsuitable for broad band transmission because the collision probability would be too high. The number of collisions increases as the data rate, packet size or network size increases.

A ring structure is better suited to high data rate transmission. Each node on the ring is functionally similar to a repeater in a binary transmission link where the upper speed is limited by the technology used. Two access protocols for such systems are the Cambridge ring and the Orwell ring (Adams, J. L., and Falconer, R. M., "ORWELL: A protocol for carrying integrated services on a digital communications ring", Electronics Letters, Vol. 20, No. 23, p 970, 8 Nov. 1984). Both systems use packet transmission and are therefore limited in speed by the processing and storage electronics which are required to assemble the packets.

To overcome the speed limitation of these protocols and other similar ones based upon packet transmission, a number of hybrid protocols have been proposed. These allow part of the time window to be used for data packets whilst part of the window is reserved for a time division multiplex (TDM). TDM allows data to be transmitted in regular time-slots without the need for packet formation and storage. TDM is particularly suited to transmission of services such as speech or video, where a guaranteed delay time is required.

Broadcast quality video transmission requires a data rate approximately 1000 times that required for speech. The high data rates associated with video transmission, and the numbers of channels required for a useful number of users, give rise to serial transmission rates approaching the state of the art for electronic circuits.

One method of the TDM approach is discussed in an article entitled "A time division multiplex approach to high data rate optical network design" by David W. Faulkner (Proc Fibre Optics '87, SPIE Vol. 734, pp1–6). The system described suffered from two design limitations. The first was the use of an inefficient line code (CMI) which allowed only 8 channels even though the system bandwidth would allow twice that number. The second was the need for digital electronics in the customer demultiplexer which operated at the multiplex rate. Both of these limitations have been overcome using channel scramblers prior to multiplexing and channel selection using a sampler and delay-lock loop in the receiver demultiplexer as described in detail in the applicant's co-pending patent application GB 8804552 (U.S. application Ser. No. 07/348,575 filed Apr. 28, 1989). The receiver there described selects a single channel by sampling the input multiplex at the channel rate with a clock phase determined by a delay-lock loop. A channel is selected by setting a locally generated descrambling sequence at a slight frequency offset from the incoming channels. Delay-lock occurs when this sequence is in bit-synchronism with an incoming channel sequence, producing descrambled data of a suitable form. Such a receiver is hereinafter referred to as "delay-lock receiver". When the data is a video signal, the deterministic component can be the line blanking interval which is detected and used to control the loop. The delay-lock receiver locks onto the TDM channel scrambled by the same sequence locally generated by the receiver, the receiver sequence. A particular TDM channel can therefore be selectively directed to chosen delay-lock receivers by scrambling the data with the receiver sequence of that receiver or receivers.

BRIEF DESCRIPTION OF THE INVENTION

According to the present invention a regenerative node for a communications network having a plurality of nodes, comprises:

a node input;

a node output;

a control means;

a delay-lock receiver including a receiver input coupled to the node input, a first sequence generator settable by the control means to generate a receiver sequence which is either a sequence associated with that node alone or a common sequence common to all the nodes of the network, the receiver being arranged to delay-lock to one of a multiplicity of TDM channels received at the receiver input which comprises data scrambled using the set receiver sequence;

a transmitter having a transmitting input, a second sequence generator settable by the control means to generate a transmitter sequence which is either a sequence associated with one of the other nodes or the common sequence, and arranged to provide transmitter signals at a transmitter output representative of data to be transmitted from the node after scrambling using the set transmitter sequence, the transmitter being slaved to the receiver so as to provide that the timing of the transmitter signals coincide with the TDM channel to which the receiver is delay-locked; and a regenerator having a regenerator input coupled to the node input, a second input coupled to the transmitter output and a regenerator output coupled to the node output and controllable by the control means to output either the TDM received by the regenerator or the TDM received by the regenerator with the signals on the channel to which the receiver is locked replaced by the transmitter signals.

According to a second aspect of the invention a communications network comprises a plurality of such regenerative nodes.

The present invention provides a network topology which allows two-way video communication without recourse to the timing problems associated with OTDMA or the technological difficulties of WDMAa-1R1, 2. The preferred ring network topology is particularly applicable to a local user group or LAN and could offer three levels of service according to the design complexity: firstly a stand-alone ring for two-way or conference communications within the local user group, secondly an extension of this ring to receive broadcast video from a BPON network, and finally a fully interconnected public switched broadband network. At present, 32 channels are considered in each case.

A ring network of such regenerative nodes provides an interactive ring network topology suitable, amongst other things, for two way video communication between nodes. The use of scrambled TDM channels and delay-lock receivers substantially reduces the need for digital electronics operating at the multiplex rate in the receiver. This reduces cost and allows the receiver to operate at any multiple of the channel rate up to the limit of the sampler acquistion time.

Both clock and time slot identification must be transmitted and recovered in order successfully to receive and demultiplex signals in a TDM format. It is possible to satisfy both requirements, and provide a basic level of data security using the network according to the present invention as will be described below.

BRIEF DESCRIPTION OF THE DRAWINGS

Embodiments of the invention and its method of operation will now be described with reference to the accompanying drawings of which

DETAILED DESCRIPTION OF PREFERRED EXEMPLARY EMBODIMENTS

Figure 1:
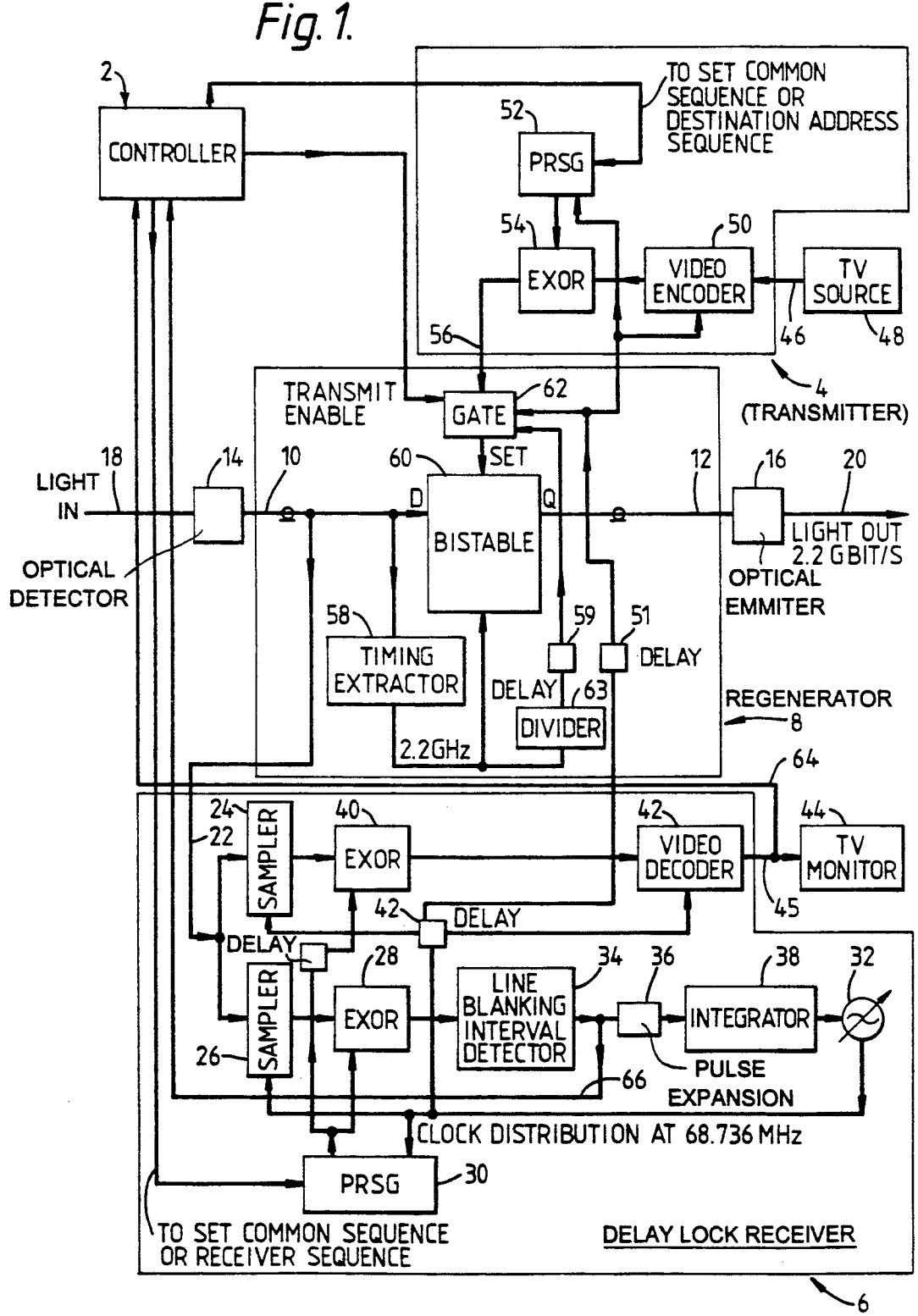
FIG. 1 is a schematic block diagram of a regenerative node according to the present invention.

Referring to FIG. 1, a regenerative node comprises a controller 2, constituting a control means of the present invention, a delay-lock receiver 6, a transmitter 44, a regenerator 8, a node input 10 and a node output 12.

Figure 2:
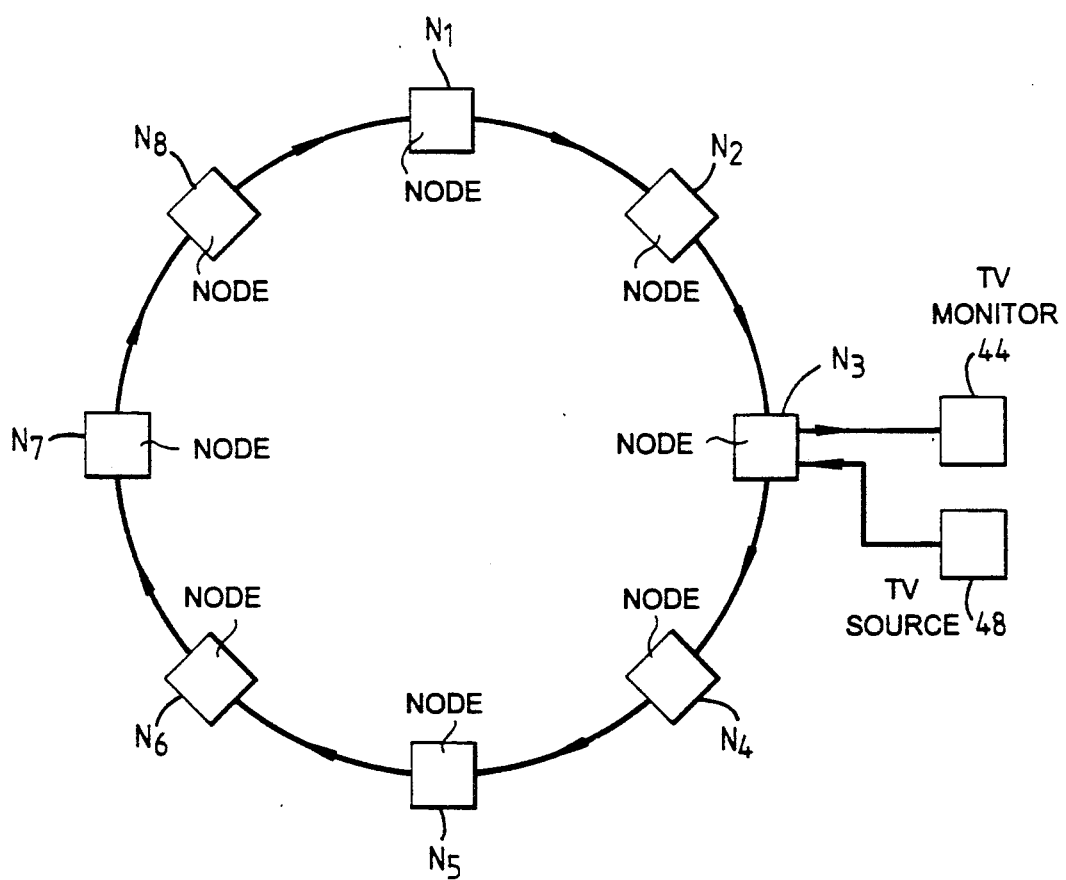
FIG. 2 is a schematic block diagram of a ring network formed by eight regenerative nodes as shown in FIG. 1.

The node input 10 and node output 12 are each connected to other like nodes to form a ring network as shown in FIG. 2 via optical detectors and emitters 14 and 16 respectively coupled to optical fibres 18 and 20. The node inputs and outputs may, alternatively, be linked by electrical interconnections.

The delay-lock receiver 6 has a receiver input 22 coupled to the node input 10 and in parallel to a delay-lock loop sampler 24 and a receive path sampler 26 comprising conventional ECL D-type bistables.

The sampler 26 samples an incoming TDM multiplex of scrambled data channels at the rate approximately equal to the channel data rate. An EXOR gate 28 performs a bit-by-bit phase comparison with a scrambling sequence generated by a receiver pseudo-random sequence generator (PRSG) 30 of conventional design. A clock signal is fed to the PRSG from a voltage controlled oscillator VCXO 32 with a start-up frequency close but not equal to the incoming channel rate of 68.736 Mbit/s so that phase slippage occurs between the sampled data channels and the PRSG sequence. When the receiver PRSG sequence coincides with a data channel scrambled by the same sequence, a descrambled data channel is output from the EXOR gate 28. The presence of a properly descrambled video channel is detected by a line blanking interval detector 34 comprising an 8-bit ECL serial to parallel convertor with wired 'or' outputs which produces a logical '0' output during the line blanking interval of the descrambled channel. This logical '0' output is fed via a pulse expansion circuit 36 to an integrator 38 which controls the VCXO 32 to maintain delay-lock at the incoming channel rate. The receiver is then delay locked to that channel. The resultant clock phase from the VCXO 32 produces data samples at the edge of the appropriate channel 'eye' pattern in the multiplex where incoming data transitions provide a suitable reference point and so the descrambled channel data from the EXOR gate 28 in the delay-lock loop contains errors. To achieve error-free reception of the video channel, the received TDM signals from the receiver input 22 are sampled and descrambled by sampler 24 and EXOR gate 40 clocked at the centre of the 'eye' pattern by delaying the clock signal from the VCXO 32 by half the TDM bit period by feeding it to the sampler 24 via a delay line 42. The EXOR 40 descrambles the error-free demultiplexed channel from the sampler 24 which is then decoded by a video decoder 42 and output to a TV monitor 44 via a receiver output 45.

The PRSG 30 of the delay-lock receiver 6 is settable by the controller 2 to generate a sequence determined by the controller.

The transmitter 4 comprises a transmitter input 46 coupled to an external TV source 48 providing data to be transmitted by the user of the node. A video encoder 50 assembles a video signal from the TV source data which is phase synchronous with the TDM channel to which the receiver 6 is delay-locked by virtue of being slaved to the receiver clock signal generated by VCXO 32. The clock signal from the delay 42 is passed to the transmitter 4 via a further delay 51 set to shift the clock signal by an amount sufficient to synchronise the transmitter's output 1 TDM bit period displaced from the clock signal from the delay 42. The data is scrambled by EXORing the data from the video encoder 50 with a transmitter sequence generated by a transmitter PRSG 52 using EXOR 54. The scrambled data channel is output at transmitter output 56.

The PRSG 52 is settable by the controller 2 to generate a sequence determined by the controller.

The regenerator 8 receives the incoming TDM signal from another node, which signal is fed to a timing extractor 58 and the D input of an bistable 60. The timing signal extracted by the extractor 58 is fed to the bistable 60 and to a gate 62 via divider 63 and a delay 59 to synchronise the timing signal with the clock signal from the delay 51. The gate 62 also has inputs from the delay 42 further delayed by delay 51, the transmitter output 56 and the controller 2.

When the controller 2 is not sending a transmit enable signal to the gate 62 the bistable 60 regenerates at its Q output the received TDM signal for transmission via the regenerator output 12, emitter 16 and optical fibre 20 to the next node. When the controller 2 does send a transmit enable signal to the gate 62, by reference to the delayed VCXO generated signal from the transmitter, overwrites the channel of the TDM to which the transmitter is delay locked with the scrambled data from transmitter 4.

The controller 2 is also coupled to the video decoder output 45 by line 64 so it can monitor the decoded channel data and to the output of the line blanking interval detector 34 by line 66 so it can monitor when the receiver delay-locks onto a channel.

A method of operation of a ring network comprising regenerative nodes according to the present invention to allow two-way video communications will now be explained with additional reference to FIG. 2 which shows eight regenerative nodes Ni, i=1 to 8, linked to form a ring network. Each node Ni has associated with it a TV source 48 and a TV monitor 44 of which only those associated with node N3 are shown for simplicity.

Each node Ni has associated with it a distinct scrambling sequence Si, and all the nodes share a common sequence Sc distinct from each sequence Si. The controller 2 can set the receiver PRSG 30 of node Ni to generate the corresponding sequence Si or the common sequence Sc, and can set the transmitter PRSG 52 to generate any one of the sequences Si as well as the common sequence Sc.

By way of example, consider the case when node N1 wishes to set up a two way video connection with node N4 which is assumed to be waiting for a call. The controller 2 of node N1 sets the receiver PRSG 30 to common sequence Sc and the transmitter sequence to S4 the sequence associated with node N4. The delay-lock receiver will then scan the TDM channels until it reaches an unused channel containing only a line blanking interval signal or all '0's scrambled by the common sequence Sc which will cause the line blanking interval detector 34 to output a signal indicating that this has happened and causing the receiver 6 to lock to that empty channel. The signal from the line blanking interval detector 34 signal is also received by the controller 2 of node N1. The controller 2 is then altered to emit a transmit enable signal to the gate 62 of the regenerator 8 to cause the regenerator 8 to output a video signal destined for N4 scrambled by the corresponding sequence S4 into the ring in the empty TDM channel that has been identified by the receiver 6 of the node N1 by reason of the transmitter 4 being slaved to the receiver 6.

The controller 2 of node N1 on finding an empty channel and enabling transmission resets the PRSG 30 of the receiver of node N1 to its own associated sequence S1 so that it will be able to descramble data in that channel from node N4 scrambled with its scrambler sequence S1. When this occurs gate 62 receives its timing from the timing extractor 58 via the divider 63 and delay 59.

Nodes N2 and N3 will regenerate this TDM channel signal from node N1 regardless of whether either is transmitting or receiving data on any other of the TDM channels.

The node N4 is assumed to be waiting for a call. As it is in waiting mode its controller 2 will have set the receiver PRSG 30 of node N4 to S4. It will therefore scan all the channels until it receives a signal having a line blanking interval scrambled by sequence S4. When the TDM channel reaches node N4 from node N1 the receiver 6 of node N4 will receive a channel to which it can, and will, delay-lock.

On delay-locking to the signal from N1 the line blanking interval detector 34 of node N4 emits a signal which is fed via line 66 to controller 2 of node N4 indicating that a signal has been received destined for that node. The signal will contain information that the channel was generated by N1. This information is extracted from the signal from the video decoder 42 of the receiving 6 of node N4 fed to controller 2. The controller 2 then sets the transmitter PRSG 52 of the transmitter 4 of node N4 to S1, the scrambler sequence associated with N1, and sends a transmit enable to the gate 62.

The data to be sent by node N4 to N1 is then transmitted by overwriting the data in the channel on which it is receiving data from N1.

Because the PRSG generator 30 of the receiver 6 of node N1 was set to S1 when it started transmitting it will now produce descrambled data at the output of the video decoder 42 sent by node N1.

When node N1 or N4 comes to the end of its data transmission, the PRSG sequence of transmitter 4 is reset by the controller 2 to the common sequence Sc and a line blanking interval signal is scrambled and transmitted to mark the fact that that node no longer wishes to transmit on that channel, that is that channel is free as far as that node is concerned. The other node will overwrite this with data for that non-transmitting node as long as it has data to transmit. Once the this node also comes to the end of its data transmission its controller 2 sets the transmitter sequence to Sc and a line blanking interval signal scrambled and transmitted. Once both nodes N1 and N4 have done this, that channel now continues to have regenerated round the ring the empty channel marker scrambled by the Sc sequence.

Should another node, or the same node, wish to start up a transmission this now vacated channel will be available in the manner first described which is applicable to any pair of nodes in the ring network.

Figure 3:
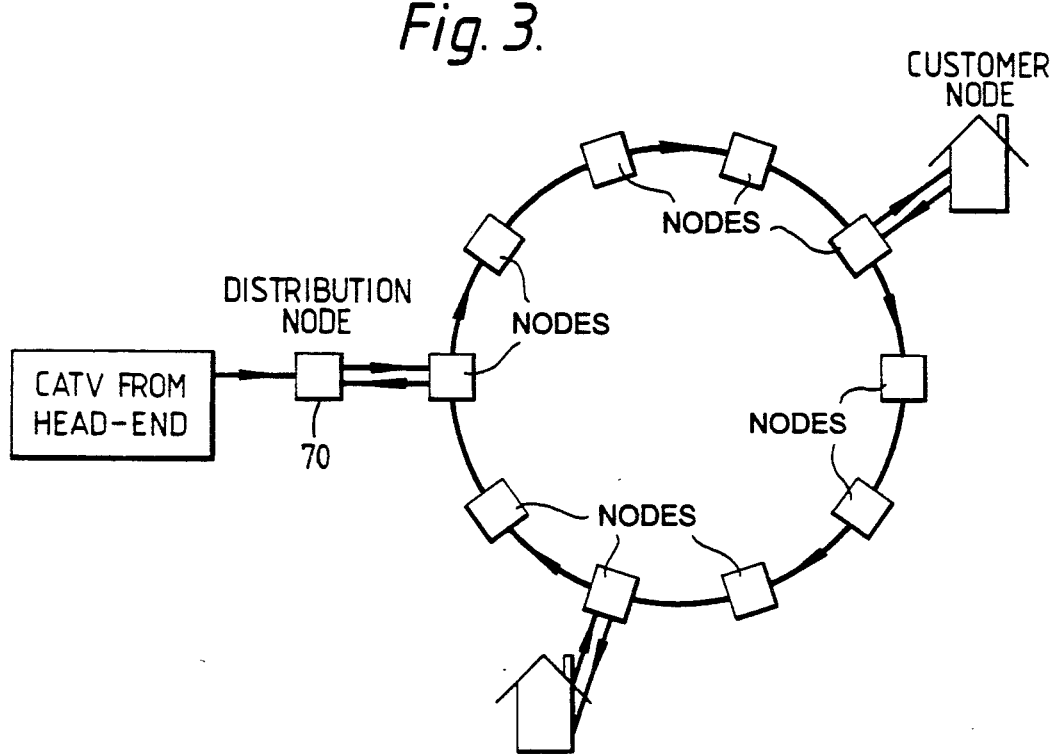
FIG. 3 is a schematic block diagram of a ring network as shown in FIG. 2 linked to allow broadcast transmission from a video source.

Referring now to FIG. 3 there is shown a regenerative ring network as shown in FIG. 2 coupled to a distribution node 70 which permits incoming video channels to be distributed to all the nodes of the ring in broadcast mode. The distribution node allows a number of video channels to be added to the ring. The number of channels and customers has to be apportioned according to demand since the downstream broadcast video occupies channels which could be used for two-way communication, such as viewphone. Using the present optimum of 32 channels, 32 customers could, for example, each receive 16 broadcast video channels and a one two-way channel on the ring.

Figure 4:
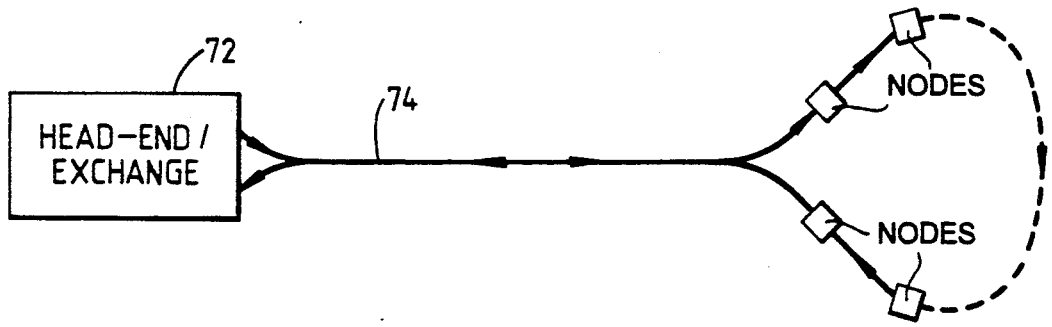
FIG. 4 is a schematic block diagram of a ring network according to the present invention arranged to provide a public switched broadband network.

Referring now to FIG. 4 there is shown a public switched broadband network which shows how CATV and two-way video services might be linked to the head-end without involving active electronics in the network. Here the distribution node is moved to the head-end or exchange 72. A duplex link 74 from the exchange could be implemented using passive couplers. The access protocol would again use the channel codes to provide destination addresses but once contact is established, low data rate channels present in the video signal would be used for signalling.

The above described network embodiments shown in FIGS. 2, 3 and 4 are in the form of a ring. It will be appreciated that other topologies can utilise the regenerative nodes, for example bus type networks.

I claim:

1. A regenerative node for a communications network having a plurality of nodes, comprising:
   a node input;
   a node output;
   a control means;
   a delay-lock receiver including a receiver input coupled to the node input, a first sequence generator settable by the control means to generate a receiver sequence which is either a sequence associated with that node alone or a common sequence common to all the nodes of the network, the receiver being arranged to delay-lock to one of a multiplicity of TDM channels received at the receiver input which comprises data scrambled using the set receiver sequence;
   a transmitter having a transmitting input, a second sequence generator settable by the control means to generate a transmitter sequence which is either a sequence associated with one of the other nodes or the common sequence, and arranged to provide transmitter signals at a transmitter output representative of data to be transmitted from the node after scrambling using the set transmitter sequence, the transmitter being slaved to the receiver so as to provide that the timing of the transmitter signals coincide with the TDM channel to which the receiver is delay-locked; and
   a regenerator having a regenerator input coupled to the node input, a second input coupled to the transmitter output and a regenerator output coupled to the node output and controllable by the control means to output either the TDM received by the regenerator or the TDM received by the regenerator with the signals on the channel to which the receiver is locked replaced by the transmitter signals.

2. A communications network comprising a plurality of regenerative nodes as claimed in claim 1.

3. A ring communications network suitable for passing data, voice and video transmissions between each of plural ring-connected regenerative nodes, each node comprising:
   a delay-lock receiver including a first sequence generator settable to generate a receiver sequence which is either (a) a sequence associated with that node alone or (b) a common sequence common to all the nodes of the network, the receiver being arranged to delay-lock to one of a multiplicity of TDM channels which comprises a transmission scrambled using the set receiver sequence;
   a transmitter having a second sequence generator settable to generate a transmitter sequence which is either (a) a sequence associated with one of the other nodes or (b) the common sequence, and arranged to provide transmitter signals representative of information to be transmitted from the node after scrambling using the set transmitter sequence, the transmitter being slaved to the receiver so as to cause the timing of transmitted signals to coincide with the TDM channel to which the receiver is delay-locked; and
   a regenerator having a regenerator input normally coupled to a node input, a second input coupled to a transmitter output and a regenerator output coupled to a node output and controllable to output either the TDM received by the regenerator at the node input or the TDM received by the regenerator at the second input.

4. A method for controlling a node in a ring-connected communications network having a plurality of such nodes, said method comprising:
   controlling a delay-lock receiver coupled to a node input to generate a receiver sequence which is either (a) a sequence associated with that node alone or (b) a common sequence common to all the nodes of the network, the receiver being arranged to delay-lock to one of a multiplicity of TDM channels received at the receiver input which comprises data scrambled using the set receiver sequence;
   controlling a transmitter to generate a transmitter sequence which is either (a) a sequence associated with one of the other nodes or (b) the common sequence, and to provide transmitter output signals representative of data to be transmitted from the node after scrambling using the set transmitter sequence, the transmitter being slaved to the receiver so as to cause the timing of the transmitted signals to coincide with the TDM channel to which the receiver is delay-locked; and
   controlling a regenerator to output from the node either (a) TDM data received by the regenerator or (b) the TDM data output by the transmitter.

5. A method for controlling a regenerative communications network node for use with scrambled, time domain multiplexed (TDM) data channels, each node having (a) a delay lock receiver for locking onto a channel scrambled by its associated scramble sequence or a common scramble sequence, (b) a transmitter slaved to the receiver for providing data to be transmitted by the node which has been scrambled by another node's scramble sequence or an empty channel scrambled by the common scramble sequence in phase synchronism with the TDM channel to which the receiver is locked, and (c) a regenerator for regenerating the received TDM channels or the TDM channels with the transmitted data overwriting the delay-locked channel, said method comprising the steps of:
   (1) in the event a first node is to initiate a call, searching for and delay-locking onto a channel having a channel empty sequence scrambled by the common sequence and thereafter transmitting a signal scrambled by the scramble sequence of the desired destination node, and
   (2) in the event a second node is to receive a call, delay-locking onto a channel having that node's scramble sequence and thereafter transmitting back to the first node in the same TDM channel using the scramble sequence of the first node.

* * * * *